United States Patent

Smith

[15] 3,681,551
[45] Aug. 1, 1972

[54] DISCONNECT SAFETY SWITCH
[72] Inventor: Gregory A. Smith, North Webster, Ind.
[73] Assignee: Lyall Electric, Inc., Albion, Ind.
[22] Filed: April 12, 1971
[21] Appl. No.: 133,293

[52] U.S. Cl..............200/161, 200/166 SD, 280/432, 340/275
[51] Int. Cl........................H01h 17/16, H01h 17/12
[58] Field of Search.............200/161, 52 R, 166 SD; 340/275, 52 R; 280/432

[56] References Cited

UNITED STATES PATENTS

| | | | |
|---|---|---|---|
| 2,305,603 | 12/1942 | Cadman | 200/161 X |
| 2,686,851 | 8/1954 | Sanda | 200/166 SD X |
| 3,210,494 | 10/1965 | Murdock | 200/161 X |
| 3,062,326 | 11/1962 | Jones et al. | 340/275 X |

Primary Examiner—Robert K. Schaefer
Assistant Examiner—Robert A. Vanderhye
Attorney—Jeffers & Rickert

[57] ABSTRACT

A safety switch for attachment to both a towing vehicle and a towed vehicle and operable to change its electrical state in the event that the two vehicles become mechanically decoupled and especially to energize electrically actuated brakes on the towed vehicle in the event of inadvertent disconnect is disclosed. The switch comprises a first member forming a switch shell having two contacts mounted therein and leads extending therefrom which when connected energize the brakes and a second two part member which slides within the first member when the vehicles are decoupled so as to connect the two contacts and then to allow separation of the two parts to prevent damage to the switch.

5 Claims, 6 Drawing Figures

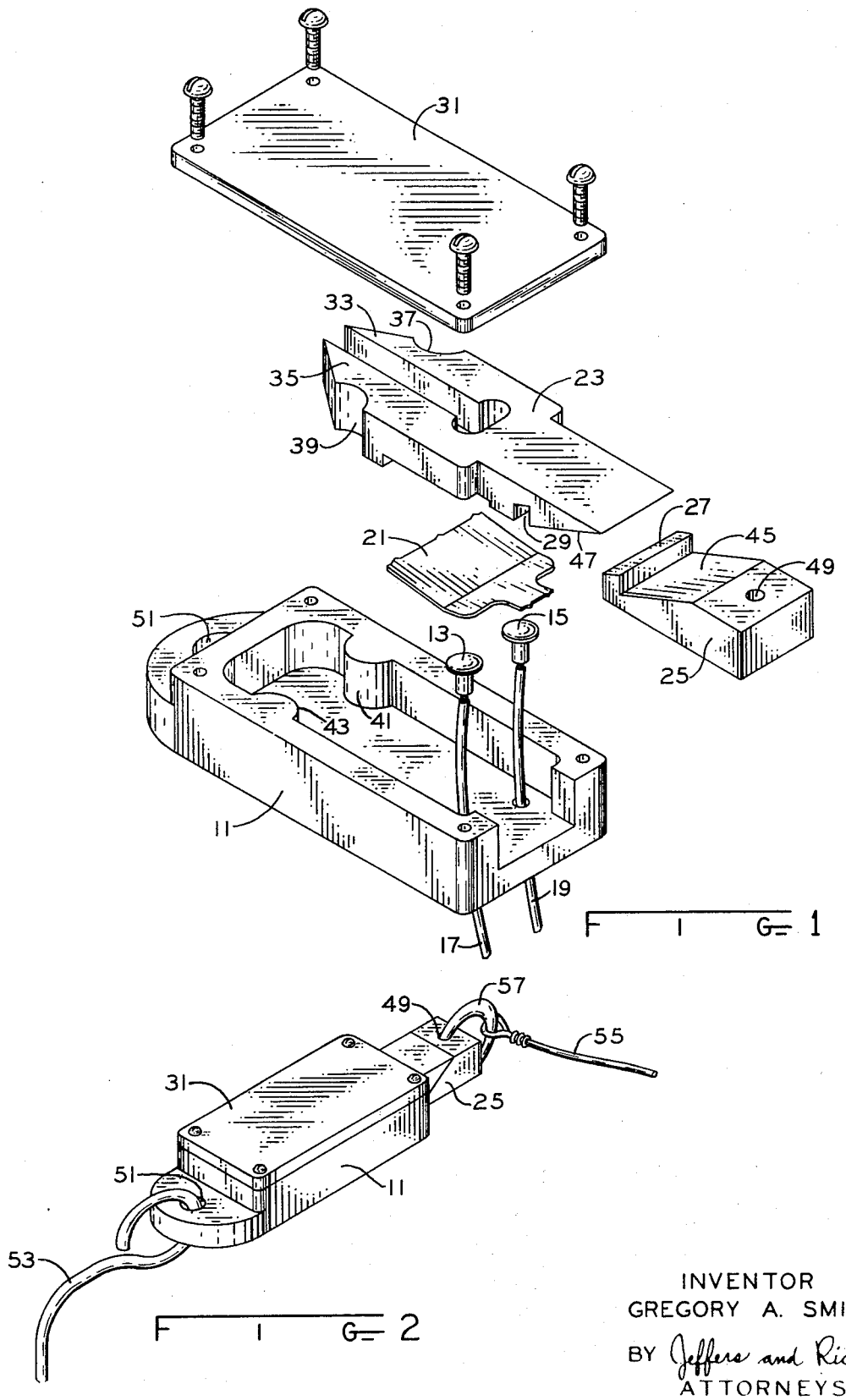

DISCONNECT SAFETY SWITCH

BACKGROUND OF THE INVENTION

The present invention relates to an electrical switch and more especially a single pole signal throw type of switch which is actuated in response to two vehicles becoming mechanically disconnected to effect the energization of a safety feature such as setting the electrically actuated brakes on the towed vehicle. Such switches are not new and the prior art typically has a metallic switch housing permanently affixed to the towed vehicle and a cable running from a removable shaft in the switch housing to the towing vehicle. In the event that the two vehicles become inadvertently disconnected, the tension on the cable exceeds a prescribed amount (usually about 40 pounds) and pulls the shaft from the switch housing. The removal of the shaft allows two spring loaded contacts within the housing to form a connection and thus energize the electrical braking system. A single spring within the switch housing serves the dual purpose of forcing the two contacts together when the shaft is removed and of defining the force required to remove the shaft.

The known prior art switches suffer from a number of defects. The attachment of the switch housing to the towed vehicle is either completely fixed or at best such as to allow rotation only of the switch housing in a single plane. This motion restricting attachment of the switch housing to the towed vehicle may defeat the entire purpose of the switch for example, if the angle at which the tension in the connecting cable is applied differs substantially from the axis along which the pin is movable it may take several hundred pounds to dislodge the 40 pound detent on the pin and in fact the cable may snap rather than the pin being pulled in which case the switch of course is never actuated.

Accordingly, it is one object of the present invention to provide a safety switch which invariably is actuated at or near its rated value.

The prior art safety switch housings are typically stamped metallic parts and subject to substantial internal moisture condensation problems and this coupled with the fact that the contact make and brake motion in the prior art switches is a simple closing motion which is not effective to remove corrosion from the switch contacts often results in a switch which is not electrically effective even though its pin has been pulled.

Accordingly, it is another object of the present invention to provide a vehicle safety switch which is less subject to moisture and aging problems than the prior art safety switches.

The prior art safety switches employ a large number of parts often of dissimilar materials and subject to corrosion.

Accordingly, it is a further object of the present invention to provide a more economical vehicle safety switch.

It is a still further object of the present invention to provide a corrosion free switch.

SUMMARY OF THE INVENTION

The present invention achieves the foregoing as well as other objects by providing a safety switch for attachment to a towed vehicle which upon actuation which occurs with the inadvertent decoupling of the towed and towing vehicles electrically closes to energize an electrical braking system or other safety feature on the towed vehicle. The contacts of the switch of the present invention are closed by a wiping motion of one movable contact across two relatively fixed contacts to which the switch leads are attached. Near the end of this wiping motion, the switch separates into two pieces thus preventing destruction of the switch each time it is actuated. One of these two separable pieces is attached to the towed vehicle in a manner to allow the free pivoting of the switch into the proper orientation and the other of these separable parts is flexibly attached to the towing vehicle so that when the two vehicles separate, the switch is drawn into proper orientation to be actuated rather than the flexible cable of the prior art being pulled at an improper angle so as to possibly break the cable rather than actuate the switch. The switch of the present invention is constructed throughout of nonmetallic materials such as Nylon or Delrin (except for the actual electrical contacts) so as to materially diminish the problems of condensation and corrosion.

It is therefore a salient object of the present invention to provide a condensation and corrosion resistant safety switch.

Still another object of the present invention is to provide a safety switch having a wiping action between the contacts which further reduces contact corrosion problems.

Yet another object of the present invention is to provide a safety switch having a mechanical disconnect so that the switch is not damaged when actuated.

It is a specific object of the present invention to provide a safety switch having a universal motion attachment to a towed vehicle to insure switch actuation rather than breaking of some portion of the switch linkage when the two vehicles inadvertently separate.

These and other objects and advantages of the present invention will appear more clearly from the following detailed disclosure read in conjunction with the accompanying drawings in which:

BRIEF DESCRIPTION OF THE DRAWING

FIG. 1 is an exploded perspective view of the switch of the present invention;

FIG. 2 is a perspective view of the switch having several possible alternative universal motion attachments connected thereto;

DESCRIPTION OF THE PREFERRED EMBODIMENT

Figure 3:
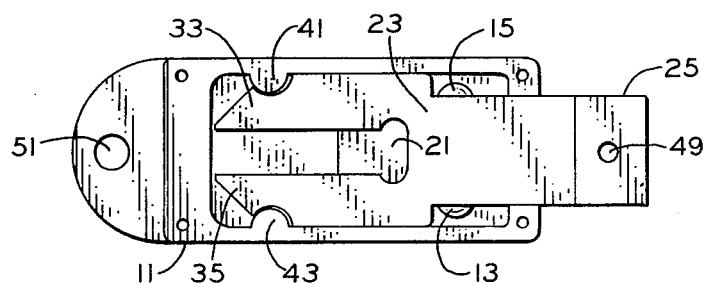
FIG. 3 is a top cut away view of the switch of FIG. 1 in its first or normal position.
Figure 4:
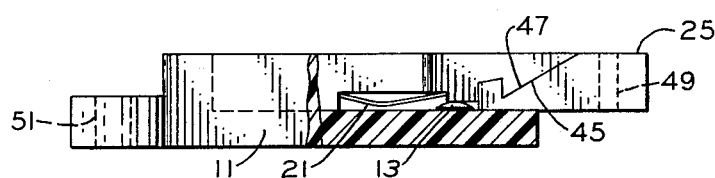
FIG. 4 is a partially cut away side view of the switch of FIG. 3.
Figure 5:
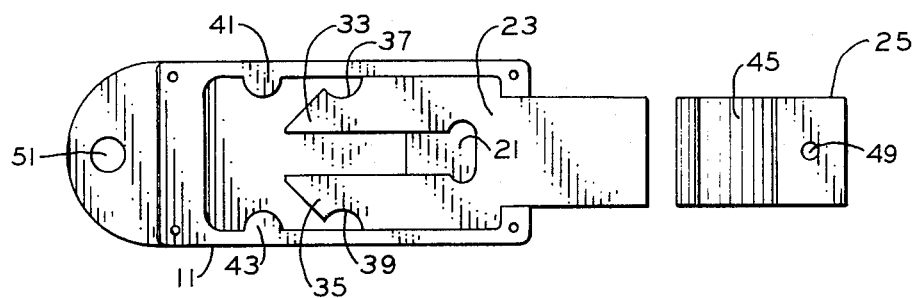
FIG. 5 is a view similar to FIG. 3 except illustrating the switch in its second or actuated position.
Figure 6:
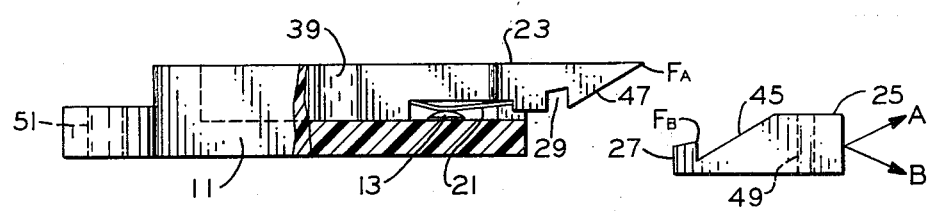
FIG. 6 is a view corresponding to FIG. 4 except illustrating the switch in its second or actuated position.

Turning first to FIG. 1 the safety switch of the present invention is seen to consist of a first member 11 which forms a shell or container for the present switch and has mounted therein first and second electrical contacts 13 and 15 respectively. These contacts have leads 17 and 19 attached thereto which are, of course, wired into the electrical system of the towed vehicle whereby the shorting of contacts 13 and 15 causes the actuation of the brakes or other safety feature on the towed vehicle. Contacts 13 and 15 are electrically interconnected by a third electrical contact 21 which is supported on and moved by motion of a second member relative to the shell 11. This second member consists of a first portion 23 and a second portion 25 which are interlocked when the switch is in its first or open position as illustrated in FIGS. 3 and 4. Thus, the two portions of the second member due to the interlocking of the protrusion 27 and the grove 29 are normally movable together until the second member is pulled sufficiently far out of the first member as illustrated in FIGS. 5 and 6 to allow the disengagement of the second portion 25 from the first portion 23.

The switch housing or shell 11 is also illustrated as having a top 31 which fastens to the shell 11 by means of a series of screws, however, in the preferred form of manufacture, this top would be molded as an integral part of the shell 11 preferably in a hingable fashion so as to allow assembly of the internal parts and subsequent folding over of the top portion to be sealed to the shell somewhat in the manner of assembly taught in the copending application by Shroyer Ser. No. 813,610, entitled "THERMO-PLASTIC LAMP HOLDER" now U.S. Pat. No. 3,581,270 dated May 25, 1971.

The first portion 23 which always remains within the shell 11 is illustrated as a bifurcated structure having two branches 33 and 35 each of which has an indentation 37 and 39 respectively. A cursory inspection of FIG. 3 shows that the indentations 37 and 39 are adapted to intermesh with protruding portions 41 and 43 on the shell 11 when the second member is in its first or normal (open) position. The first and second portions of the second member when interlocked not only have their protrusion and groove interlocked but also have a pair of surfaces 45 and 47 in intimate contact. The function of these surfaces as well as the function of the holes 49 and 51 will appear more clearly from the subsequent discussion of the remaining figures of the drawing.

Referring briefly to FIG. 2, the aperture 51 has passed therethrough a pivotable connecting means 53 which in turn is attached to the towed vehicle for example by threading the shaft of the connecting means 53 and bolting it to the frame of the towed vehicle which may be by way of example a large travel trailer. This pivotable connecting means allows the switch a virtually universal motion so that it may follow where ever a flexible connecting means such as a cable 55 may lead it. This, of course, overcomes the above noted prior art deficiency and always insures that the pull exerted by the cable 55 will be in the proper direction for actuating the switch. This flexible connecting means or cable 55 may be directly passed through the aperture 49 or as an alternative a chain 57 may constitute some or all of this connecting means. Clearly, a few links of a similar chain could be relied on to connect the aperture 51 with the frame of the towed vehicle. The cable 55 of course is connected to some point on the towing vehicle such, for example, as the bumper on an automobile. As can be seen from FIG. 2, sufficient tension on the cable 55 will result in actuation of the safety switch as is more clearly describable in reference to FIGS. 3 through 6.

Considering first FIGS. 3 and 4 which illustrate the switch in its first position which is the normal position with the contacts 13 and 15 not being shorted out by the third electrical contact 21. In this position, the protuberances 41 and 43 are intermeshed with the pair of mating indentations in the branches of the bifurcation of the first portion 23. Clearly, the intermeshing of these protuberances and indentations impedes the removal or movement of the first portion 23 to the right as illustrated relative to the shell or container 11. Considering FIGS. 2 and 3 together, it should be clear that force applied between the pivotable connecting means 53 and the flexible connecting means 55 which tends to urge the first portion 23 to slide (this is the only motion it is free to execute) toward the right will also cause the two branches 33 and 35 to bend toward one another. By varying the materials used and the dimensions of the protuberances and indentations almost any threshold level desired may be established beyond which tension on the two connecting means will cause the detenting effect to be overcome and will allow the first portion to move rightwardly as shown and will effect a transition from the position illustrated in FIGS. 3 and 4 to the second position illustrated in FIGS. 5 and 6. A desirable threshold level is 40 pounds. In FIGS. 5 and 6, the third electrical contact 21 is shorting out the first and second electrical contacts 13 and 15 thus indicating to the towed vehicle a stop or emergency situation. In effecting the transition between these two positions, it should also be clear that the contact 21 executes a wiping motion across the contacts 13 and 15 and thus tends to clean the surfaces for better electrical connection, thus, overcoming another of the above mentioned prior art defects. The relative configurations of the shell 11 and the first portion 23 of course limit the possible relative motion of these two items to the linear motion between that depicted in FIG. 3 and that depicted in FIG. 5. Thus, sliding motion only is allowed between these two members.

Similarly, sliding motion only is allowed between the shell 11 and the second portion 25 at least so long as the first and second members are in the relative positions illustrated in FIG. 4. On the contrary, the second portion 25 is in no way restricted in its movement when its position relative to the shell 11 is that illustrated in FIG. 6. Hence, while the second member may slide only relative to the first member in executing a portion of the transmission from the first position illustrated in FIGS. 3 and 4 to the second position illustrated in FIGS. 5 and 6 there is some point along this transitional process where the second portion 25 becomes readily separable from the first portion 23 and in fact when this point is reached a novel means for disengaging the first and second portions becomes effective to save the safety switch from total destruction.

As noted in the discussion of FIG. 1, the first and second portions are provided with gently sloping portions 45 and 47 which are in intimate contact as illustrated in FIG. 4. As soon as the second portion 25 is free to separate from the first portion 23 any slight pull as, for example, on the flexible cable 55 will result in these two pieces disengaging. To see why this is true, consider first a force applied to the second portion 25 along the vector A as illustrated in FIG. 6. Forces applied to the second portion 25 along the vector A create a fulcrum between the surfaces 45 and 47 near the tip of the member 23 and illustrated as $F_A$. The member 25 is so dimensioned that further pull along the vector A rotates the member 25 in a counter-clockwise direction as viewed and immediately extracts the interlocking protrusion or key portion 27 from the groove 29, thus, allowing the second portion to fall away freely. On the other hand, assume that the two portions are still interlocked and that the second portion 25 experiences a tensional force along the vector B. Under these circumstances, the second portion 25 will experience a slight rotational movement in the clockwise direction and a fulcrum will be created within the groove 29 and specifically at that portion of the groove which is touching one point on the interlocking key 27 denominated as $F_B$ in FIG. 6. Making the inside of the groove 29 sufficiently smooth and of the appropriate material or sloping the edge of the groove 29 somewhat is sufficient to allow the key 27 to slide down and out of the groove in response to forces along the vector B. A triangularly shaped groove 29 and corresponding triangular key 27 could of course be used to effect this same result, however, the configuration illustrated has been found adequate to prevent damage to the switch. Thus, it can be seen that the two portions 23 and 25 of the second member are interlocked when the switch is in the first position as illustrated in FIGS. 3 and 4 but are completely free of one another when the switch has effected the transition to its second position as illustrated in FIGS. 5 and 6.

Thus, while the present invention has been described with respect to a specific embodiment, numerous modifications will suggest themselves to those of ordinary skill in the art and accordingly the scope of the present invention is to be measured only by that of the appended claims.

I claim:

1. A safety switch for attachment to both a towing vehicle and a towed vehicle and operable to change its electrical state in the event that the two vehicles become mechanically decoupled comprising:

first and second relatively movable members, said first member being pivotally attachable to said towed vehicle and said second member comprising two portions the first of which is confined within said first member for sliding motion only relative thereto and the second of which is flexibly attachable to said towing vehicle;

first and second electrical contacts supported by said first member;

a third electrical contact supported by said second member first portion and adapted to electrically disconnect said first and second contacts when said second member is in a first position relative to said first member and to electrically interconnect said first and second contacts when said second member is in a second position relative to said first member, the two portions of the second member being readily separable in said second position and relatively inseparable in said first position, said second portion of said second member being also confined within said first member for sliding motion only relative thereto when said second member is in said first position relative to said first member and said second member being free of said first member when said second member is in said second position relative to said first member.

2. The switch of claim 1 wherein said first and second portions interlock when said second portion is confined within said first member and further comprising means for disengaging said first and second portion when said second portion is no longer confined within said first member.

3. The switch of claim 1 further comprising detent means associated with said first and second members for impeding the transition from said first position to said second position.

4. The switch of claim 3 wherein said detent means yields allowing the transition from said first position to said second position in response to tensional forces between said flexible connecting means and said pivotable connecting means in excess of a predetermined threshold but does not yield in response to lesser tensional forces.

5. The switch of claim 3 wherein said first portion of said second member is bifurcated, said detent means comprising a pair of protuberances internal to said first member and extending generally toward one another, and a mating pair of indentations one in each branch of said bifurcation, said protuberances and said indentations being intermeshed when said second member is in said first position relative to said first member, said branches yielding toward one another in response to transition urging forces exceeding a predetermined threshold so as to disengage said protuberances from said indentations and allow said second member to execute the transition from said first position to said second position relative to said first member.

* * * * *